US007676579B2

(12) United States Patent
Harris et al.

(10) Patent No.: US 7,676,579 B2
(45) Date of Patent: Mar. 9, 2010

(54) PEER TO PEER NETWORK COMMUNICATION

(75) Inventors: Adam Pierce Harris, San Diego, CA (US); Jeremy Joseph Gordon, San Francisco, CA (US); Mark Jacob, San Diego, CA (US)

(73) Assignee: Sony Computer Entertainment America Inc., Foster City, CA (US)

( * ) Notice: Subject to any disclaimer, the term of this patent is extended or adjusted under 35 U.S.C. 154(b) by 861 days.

(21) Appl. No.: 10/215,899

(22) Filed: Aug. 8, 2002

(65) Prior Publication Data
US 2003/0212795 A1 Nov. 13, 2003

Related U.S. Application Data

(60) Provisional application No. 60/380,396, filed on May 13, 2002.

(51) Int. Cl.
G06F 15/16 (2006.01)
(52) U.S. Cl. .................... 709/227; 709/245; 709/220; 709/246; 463/36; 463/38; 463/39; 713/171; 713/155
(58) Field of Classification Search ................ 709/227, 709/245, 250, 246, 220; 463/36, 38, 39; 713/151
See application file for complete search history.

(56) References Cited

U.S. PATENT DOCUMENTS

| 5,636,216 | A | * | 6/1997 | Fox et al. ..................... 370/402 |
| 5,793,763 | A | * | 8/1998 | Mayes et al. ................. 370/389 |
| 5,956,485 | A | | 9/1999 | Perlman |
| 6,058,431 | A | * | 5/2000 | Srisuresh et al. ............. 709/245 |
| 6,128,623 | A | | 10/2000 | Mattis et al. ................. 707/103 |
| 6,128,624 | A | | 10/2000 | Papierniak et al. ........... 707/104 |
| 6,128,627 | A | | 10/2000 | Mattis et al. ................. 707/202 |
| 6,128,664 | A | * | 10/2000 | Yanagidate et al. .......... 709/228 |
| 6,151,584 | A | | 11/2000 | Papierniak et al. ............ 705/10 |

(Continued)

FOREIGN PATENT DOCUMENTS

WO WO99/35799 7/1999

(Continued)

OTHER PUBLICATIONS

Network Address Translators. Microsoft Corporation Jan. 2001. http://msdn.microsoft.com/library/default.asp?url=/library/en-us/dnplay/html/nats2-msdn.asp.*

(Continued)

Primary Examiner—Saleh Najjar
Assistant Examiner—Thuong T Nguyen
(74) Attorney, Agent, or Firm—Frommer Lawrence & Haug LLP; William S. Frommer; Thomas F. Presson

(57) ABSTRACT

Methods and apparatus for peer to peer network communication. In one implementation, a method of communicating between a first client system and a second client system includes: discovering first address information for a first client system connected to a first network address translation device; sharing the first address information with a second client system; receiving second address information for the second client system; and establishing communication between the first client system and the second client system using the second address information.

41 Claims, 11 Drawing Sheets

U.S. PATENT DOCUMENTS

| | | | | |
|---|---|---|---|---|
| 6,151,601 | A * | 11/2000 | Papierniak et al. | 707/10 |
| 6,208,649 | B1 | 3/2001 | Kloth | 370/392 |
| 6,209,003 | B1 | 3/2001 | Mattis et al. | 707/206 |
| 6,212,565 | B1 | 4/2001 | Gupta | 709/229 |
| 6,289,358 | B1 | 9/2001 | Mattis et al. | 707/203 |
| 6,292,880 | B1 | 9/2001 | Mattis et al. | 711/216 |
| 6,333,931 | B1 | 12/2001 | LaPier et al. | 370/385 |
| 6,353,891 | B1 | 3/2002 | Borella et al. | 713/201 |
| 6,389,462 | B1 | 5/2002 | Cohen et al. | |
| 6,393,488 | B1 * | 5/2002 | Araujo | 709/245 |
| 6,535,511 | B1 * | 3/2003 | Rao | 370/392 |
| 6,581,108 | B1 * | 6/2003 | Denison et al. | 709/245 |
| 6,618,757 | B1 * | 9/2003 | Babbitt et al. | 709/226 |
| 6,636,898 | B1 * | 10/2003 | Ludovici et al. | 709/250 |
| 6,779,035 | B1 * | 8/2004 | Gbadegesin | 709/228 |
| 6,789,126 | B1 | 9/2004 | Saulpaugh et al. | |
| 7,107,348 | B2 * | 9/2006 | Shimada et al. | 709/229 |
| 7,133,368 | B2 * | 11/2006 | Zhang et al. | 370/249 |
| 7,155,518 | B2 * | 12/2006 | Forslow | 709/227 |
| 7,216,359 | B2 | 5/2007 | Katz et al. | |
| 7,254,709 | B1 * | 8/2007 | Richard | 713/171 |
| 2002/0016826 | A1 * | 2/2002 | Johansson et al. | 709/207 |
| 2002/0143855 | A1 * | 10/2002 | Traversat et al. | 709/202 |
| 2003/0051052 | A1 | 3/2003 | Shteyn et al. | |
| 2003/0055978 | A1 * | 3/2003 | Collins | 709/227 |
| 2003/0135625 | A1 | 7/2003 | Fontes et al. | |
| 2004/0249891 | A1 | 12/2004 | Khartabil et al. | |
| 2005/0149481 | A1 * | 7/2005 | Hesselink et al. | 707/1 |
| 2007/0150552 | A1 | 6/2007 | Harris et al. | |

FOREIGN PATENT DOCUMENTS

| | | |
|---|---|---|
| WO | WO 01/97485 A2 | 12/2001 |
| WO | WO02/03217 | 1/2002 |
| WO | WO 02/23822 A1 | 3/2002 |

OTHER PUBLICATIONS

NAT and Peer-to-peer networking. Dan Kegel. Copyright 1999. http://alumnus.caltech.edu/~dank/peer-nat.html.*

NAT and Network Games, p. 1-5, Entitled: Just the FAQs, Ma'am, http://www.u.arizona.edu/~trw/games/nat.htm, Oct. 23, 2002.

BroadbandReports.com, How to hookup your console to the net—section all, pp. 1 to 22, http://www.dslreports.com/faq/onlinegaming/all.

NAT or Not, Do I use NAT?, pp. 1 to 3, http://www.u.arizona.edu/~trw/games/nat or not.php, Oct. 23, 2002.

Home Toys Article, HAI Omni Solution, UPnP NAT Traversal FAQ, pp. 1 to 4, http://hometoys.com/htinews/aug01/articles/microsoft/upnp.htm, Nov. 11, 2002.

InternetGatewayDevice: 1 Device Template Version 1.01, Copyright 1999-2001 Microsoft Corporation, 16 pgs.

STUN—Simple Traversal of UDP Thrugh NATs, J. Rosenberg et al. pp. 1-29, Copyright The Internet Society.

Traveral Using Relay NAT (TURN), Rosenberg, Weinberger, Huitema, Mahy, Nov. 14, 2001, pp. 1 to 17. http://ww.dslreports.com/ip.

Office Action issued by the U.S. Patent Office on May 5, 2009, in related U.S. Appl. No. 11/708,988.

* cited by examiner

PEER TO PEER NETWORK COMMUNICATION

RELATED APPLICATIONS

This application claims the benefit of U.S. Provisional Application No. 60/380,396 filed May 13, 2002, the disclosure of which is incorporated herein by reference.

BACKGROUND

One typical type of NAT server (network address translation server) acts as a gateway between a local network and an external network, such as the Internet. This NAT server is a network device that allows one or more machines (e.g., computers) in the local network to share one public or external network address, such as an Internet address. The NAT server maintains a set of unique local or internal network addresses for the machines in the local network. Accordingly, each machine in the local network has a local network address and a public network address. For communication between the local network and the external network, the NAT server translates back and forth between the public network address and the local network addresses for each of the machines. Typically this network address translation is transparent to the individual machines within the local network and so the machines are not aware of the public address used by the NAT server.

SUMMARY

The present disclosure provides methods and apparatus for peer to peer network communication. In one implementation, a network system includes: a first network address translation device, connected to a network and having a first public network address; a first client system, connected to the first network address translation device and having a first local network address established by the first network address translation device; a second network address translation device, connected to the network and having a second public network address; a second client system, connected to the second network address translation device and having a second local network address established by the second network address translation device; an address server, connected to the network; a matching server, connected to the network; where the first network address translation device, the second network address translation device, the address server, and the matching server can send data to each other through the network, where the address server determines a public network address for a client system from data received from the client system and returns the derived public network address to the client system, where the matching server includes a registry table for registering client systems and storing the public network address and local network address for one or more registered client systems, where the first client system includes: a first network address manager for communicating with the address server to determine the first public network address, a first network registration manager for registering the first client system with the matching server, a first network sharing manager for sharing the first public network address and the first local network address with the second client system, where the second client system includes: a second network address manager for communicating with the address server to determine the second public network address, a second network registration manager for registering the second client system with the matching server, a second network sharing manager for sharing the second public network address and the second local network address with the first client system. In another implementation, the network system also includes a mapping maintenance server connected to the network.

In another implementation, a method of communicating between a first client system and a second client system includes: discovering first address information for a first client system connected to a first network address translation device; sharing the first address information with a second client system; receiving second address information for the second client system; and establishing communication between the first client system and the second client system using the second address information.

DETAILED DESCRIPTION

The present invention provides methods and apparatus for peer to peer network communication. The present invention allows two peer or client systems (e.g., network-enabled video game console systems) to communicate with each other across a network (e.g., the Internet) even though one or both client systems are behind respective NAT devices (network address translation devices). As described below, in one implementation, the network communication uses a four part process: (1) discovery—each client system discovers its public address on the network, (2) sharing/distribution—each client system shares its address information with other systems that wish to communicate, (3) communication establishment—the client systems establish communication, and (4) mapping maintenance—each client system maintains its current address mapping in the corresponding NAT device.

Figure 1:
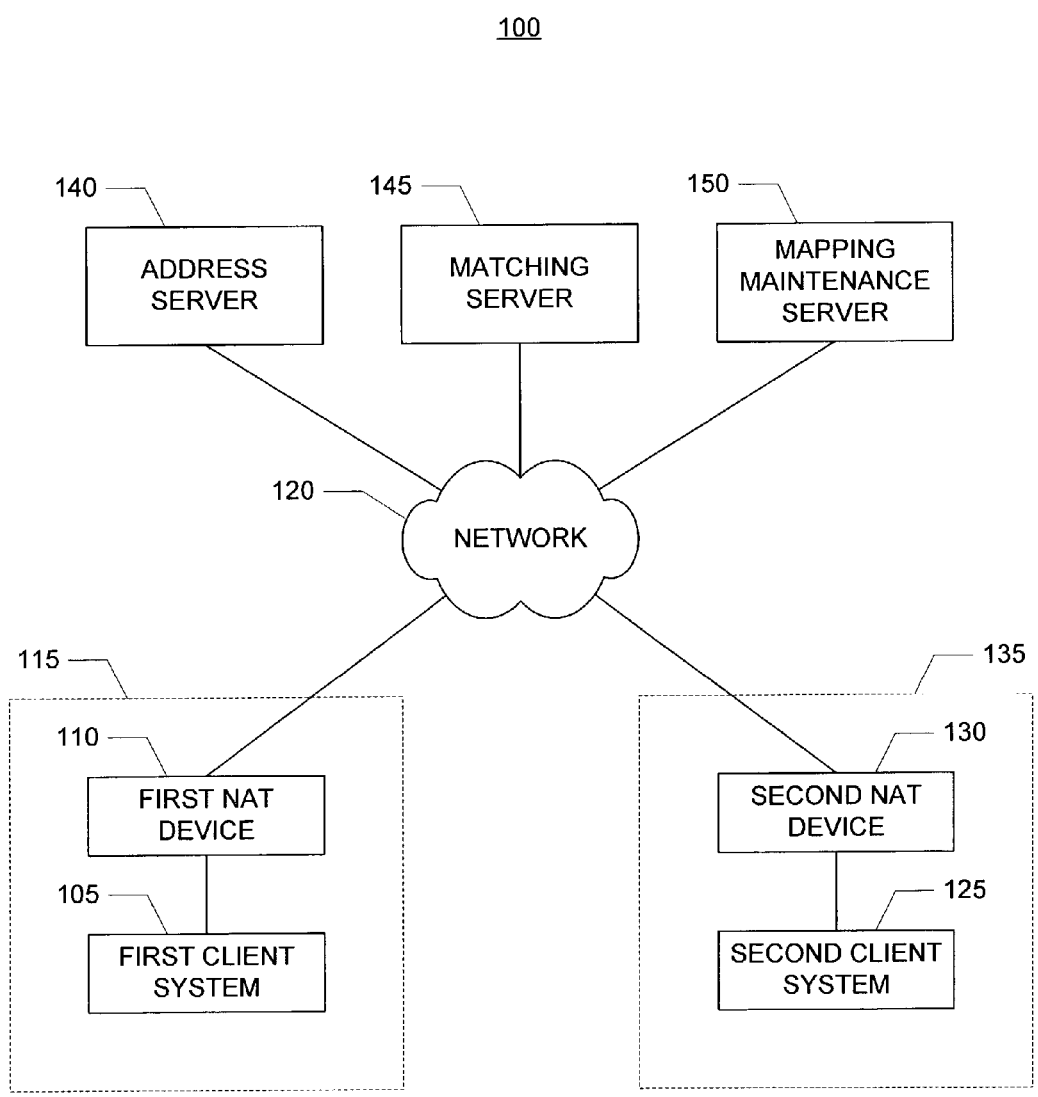
FIG. 1 shows a network system architecture.

FIG. 1 shows a network system architecture 100. A first client system 105 is connected to a first NAT device (network address translation device) 110, forming a first local or internal network 115. The first client system 105 is a network-enabled system, such as a video game console system including a network adapter or a computer system. As a video game console system, the first client system 105 includes hardware and/or software providing video game functionality and hardware and/or software providing network communication as described below. In one implementation, the first client system 105 is a "Playstation 2"™ game console by Sony Computer Entertainment Inc.™ The first NAT device 110 is a typical NAT box or NAT server, or alternatively is a type of proxy server or part of a gateway, router, or firewall. One or more additional systems or network devices, such as a computer, may also be connected to the first NAT device 110 and be within the first local network 115. Each system in the first local network 115 has a local network address assigned and maintained by the first NAT device 110. In one implementation, a local network address in the first local network 115 includes an address number and a port number, such as according to UDP/IP (e.g., where the address number is an IP address). In an alternative implementation, the first local network 115 uses a different communication protocol and so the local network address includes different information to identify a system.

The first NAT device 110 is connected to an external or public network 120, such as the Internet. Each addressable system or device connected to the external network 120 has a public network address. A "public" network address is used on the external network 120 and "local" network addresses are used within local networks, such as the first local network 115. In one implementation, a public network address includes an address number and a port number, such as according to UDP/IP. In an alternative implementation, the external network 120 uses a different communication protocol and so the public network address includes different information to identify a system. In one implementation, the local network addresses of the first local network 115 are not compatible with the external network 120 (e.g., the local network addresses are not recognizable in the communication protocol of the external network 120).

The first NAT device 110 has a public network address. The first client system 105 is indirectly connected to the external network 120 through the first NAT device 110 and does not have a public network address. The first client system 105 shares the public network address of the first NAT device 110 with other systems in the first local network 115 (if any are present). The first NAT device 110 assigns a local network address to each system in the first local network 115. The first NAT device 110 translates between the public network address and local network addresses to route data between the external network 120 and the first local network 115. In an alternative implementation, the first NAT device 110 has a two or more public network addresses to share among systems in the first local network 115.

In one implementation, the first NAT device 110 maps port numbers to systems in the first local network 115, such as by using a PAT technique (Port Address Translation). The first NAT device 110 assigns a port number to a local system in the first local network 115 when the local system sends data to a destination on the external network 120. The first NAT device 110 stores the port number as a port mapping between the port number and the local system. The first NAT device 110 assigns and stores a single port number for all outgoing data from a single local system. The first NAT device 110 includes the assigned port number with the outgoing data and so the recipient can use the port number when responding. The first NAT device 110 determines which system in the first local network 115 is the intended recipient of incoming data by comparing the port number attached to the incoming data with the port mappings stored within the first NAT device 110.

The first NAT device 110 establishes and adjusts the port mappings dynamically according to data sent and received using the mapping. If the first NAT device 110 does not receive data from a local system or from the external network 120 including a port number for a period of time, the first NAT device 110 releases the port mapping for that port number (a "timeout"). As described below, the first client system 105 can prevent this timeout by periodically sending messages out to the external network 120.

In one implementation, the first NAT device 110 screens incoming data (e.g., for security reasons) by comparing the network address of the sender of the incoming data with addresses of recipients of data sent by the local system indicated by the port number. When the first NAT device 110 sends data from a local system to a recipient on the external network 120, the first NAT device 110 records the destination address along with the port mapping for the local system. The first NAT device 110 does not forward incoming data to a local system on the first local network 115 if the local system has not already sent data to a recipient at the same network address as that of the incoming data. The first NAT device 110 compares the network address of the sender of incoming data with the recorded destination address(es) of outgoing data using the port included with the incoming data. As described above, the first NAT device 110 records destination addresses along with port mappings, so the first NAT device 110 can use a port number as an index to find destination addresses to which data has been sent by a local system. If there is not a match, the first NAT device 110 does not forward the incoming data into the first local network 115. As described below, the first client system 105 uses this security functionality to "approve" a system on the external network 120 by sending data to that system and so causes the first NAT device 110 to allow data from that approved system into the first local network 115.

For example, when the first client system 105 sends data to a recipient on the external network 120 the first NAT device maps a port number to the first client system 105. The first NAT device 110 includes the public network address for the first NAT device 110 and the mapped port number for the first client system 105 with the outgoing data. The first NAT device 110 also records the address of the recipient. When the first NAT device 110 receives data including that port number, the first NAT device 110 compares the address of the sender with the recorded address of the destination for the previously sent outgoing data. If the addresses match, the first NAT device 110 forwards the data to the first client system 105 using the local network address of the first client system 105.

A second client system 125 is connected to a second NAT device 130, forming a second local network 135. Similar to the first client system 105, the second client system 125 is a network-enabled system, such as a video game console system including a network adapter. Similar to the first NAT device 110, the second NAT device 130 is a typical NAT box or NAT server, or alternatively is a type of proxy server or part of a gateway or router. The second client system 125 and the second NAT device 130 operate similarly to the first client system 105 and the first NAT device 110, respectively (e.g., in terms of port mapping and screening incoming data). One or more additional network devices may also be connected to the second NAT device 130 and be within the second local network 135. Each system or device in the second local network 135 has a local network address assigned and maintained by the second NAT device 130, similar to the first local network 115. In one implementation, the first local network 115 and the second local network 135 are the same type of network and so use the same communication protocol, however, in alternative implementations, the local networks 115, 135 can be different types.

Similar to the first NAT device 110, the second NAT device 130 is connected to the external network 120. Accordingly, the second client system 125 is indirectly connected to the external network 120 through the second NAT device 130. The NAT devices 110, 130 can send data to each other through the external network 120 according to the protocols of the external network 120.

Three server systems are connected to the external network 120 as well: an address server 140, a matching server 145, and a mapping maintenance server 150. Each of the server systems 140, 145, 150 is a network server system, such as a computer system or a mainframe system. Alternatively, some or all of the server systems 140, 145, 150 are included within a single system connected to the external network 120. Each of the server systems 140, 145, 150 has a respective network address on the external network 135. These server network addresses are known to the client systems 105, 125. The address server 140 assists the client systems 105, 125 with address discovery. The matching server 145 assists the client systems 105, 125 with address sharing. The mapping maintenance server 150 assists the client systems 105, 125 with maintaining the address mapping of the NAT devices 110, 130, respectively. In an alternative implementation, the maintenance mapping server is omitted.

Figure 2:
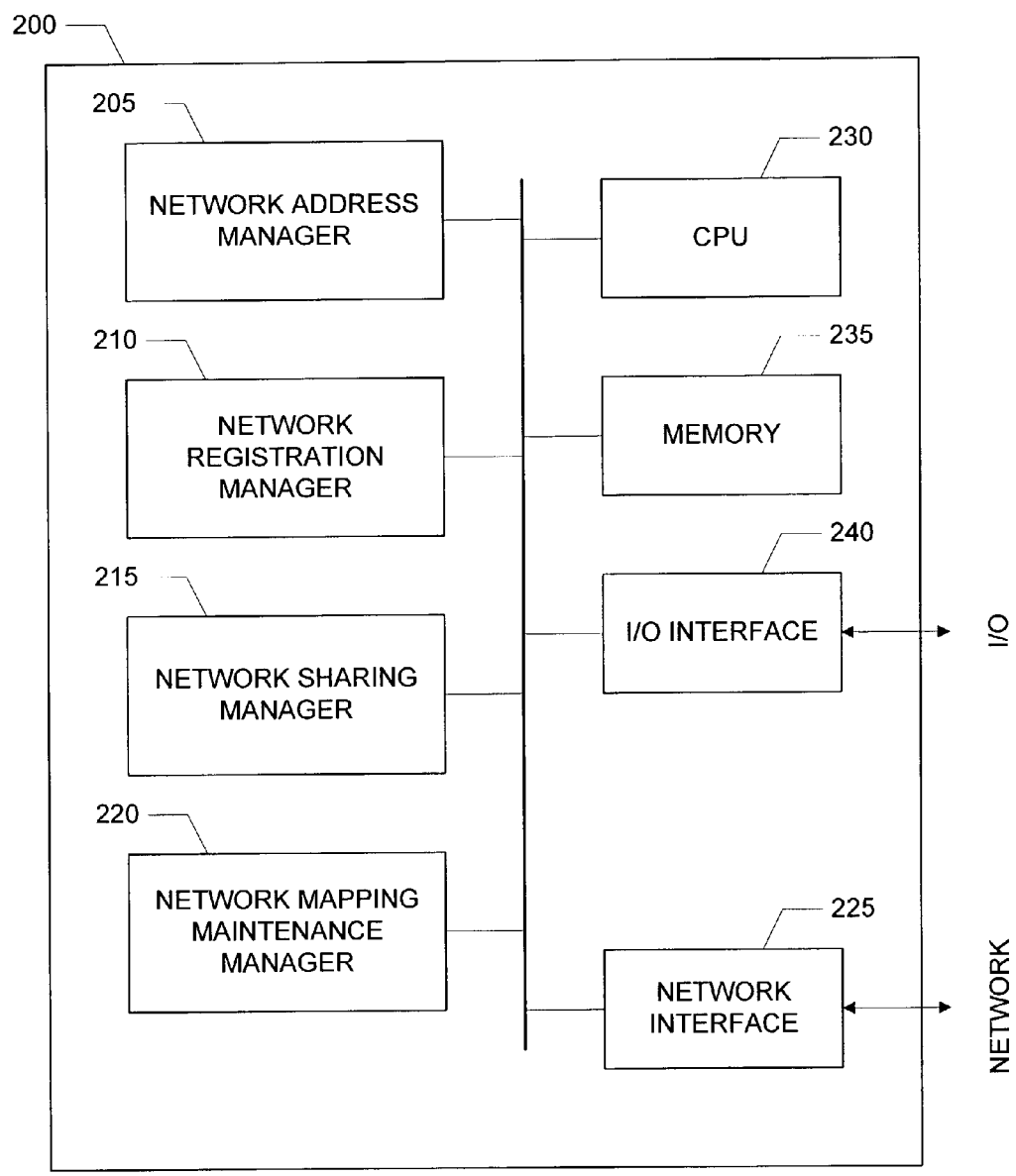
FIG. 2 is a block diagram of one implementation of a client system.

FIG. 2 is a block diagram of one implementation of a client system 200, such as first client system 105 in FIG. 1. The client system 200 includes four managers: a network address manager 205, a network registration manager 210, a network sharing manager 215, and a network mapping maintenance manager 220. Each of the managers 205, 210, 215, 220 is implemented as a software component of the client system 200. Alternatively, some or all of one or more of the mangers 205, 210, 215, 220 is implemented in hardware. The network address manager 205 controls communication between the client system 200 and the address server 140 to discover a public network address associated with the client system 200 by a connected NAT device, such as the first NAT device 110. The network registration manager 210 controls communication between the client system 200 and the matching server 145 to register the client system 200 with the matching server 145. The network sharing manager 215 controls communication with the matching server 145 to determine the public and local network addresses of another client system that has requested communication with the client system 200. The mapping maintenance manger 220 controls communication with the mapping maintenance server 150 to prevent the NAT device connected to the client system 200 from timing out the mapping established for the client system 200. In an alternative implementation, the client system 200 does not include a mapping maintenance manager 220. The client system 200 includes a network interface 225 for connecting to and communicating with the local network of the client system 200. The network interface 225 includes a network communication device, such as a network adapter or modem. The client system 200 also includes components for general operation, such as a CPU 230, memory 235, and an I/O interface 240. For a game console client system, the client system includes additional video, sound, and application specific software and/or hardware ("game components"). As noted above, in one implementation, a client system 200 is a "Playstation 2"™ by Sony Computer Entertainment Inc.™ including hardware and software for network communication as described herein.

Figure 3:
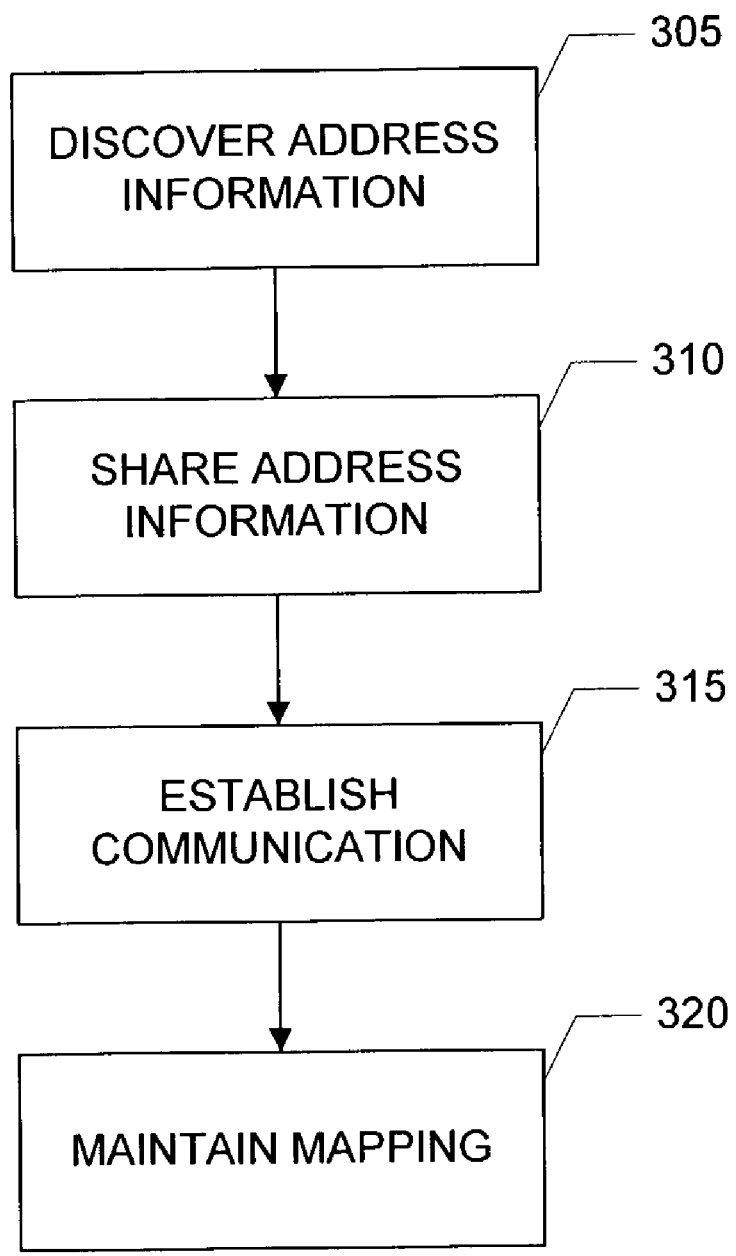
FIG. 3 is a flowchart of establishing and maintaining peer to peer network communication between two client systems.

FIG. 3 is a flowchart of establishing and maintaining peer to peer network communication between two client systems, such as the first client system 105 and the second client system 125 in FIG. 1. Each client system discovers its address information, block 305. A client system, such as the client systems 105, 125 in FIG. 1, has associated address information including a public network address and a local network address. As described below referring to FIG. 4, a client system discovers its public network address by communicating with the address server (recall the address server 140 in FIG. 1). A client system discovers its local network address by accessing locally stored information or by querying the corresponding NAT device. The client systems share their discovered address information with each other, block 310. As described below referring to FIG. 5, one or both of the client systems register with the matching server (recall the matching server 145 in FIG. 1). One of the client systems requests communication with the other registered client system and the matching server shares the address information between the client systems. The client systems establish communication with each other using the received address information, block 315. As described below referring to FIG. 6, each client system sends messages to the other client system using the shared address information so that the NAT devices recognize the incoming messages as "approved." While the client systems are communicating, the client systems maintain the mapping established by the corresponding NAT devices, block 320. As described below referring to FIG. 8, each client system periodically sends messages to the mapping maintenance server (recall the mapping maintenance server 150 in FIG. 1) so that the corresponding NAT device does not change or timeout the established port mapping for the client system. In an implementation that does not include a mapping maintenance server, the client systems do not maintain this mapping using a mapping maintenance server.

Figure 4:
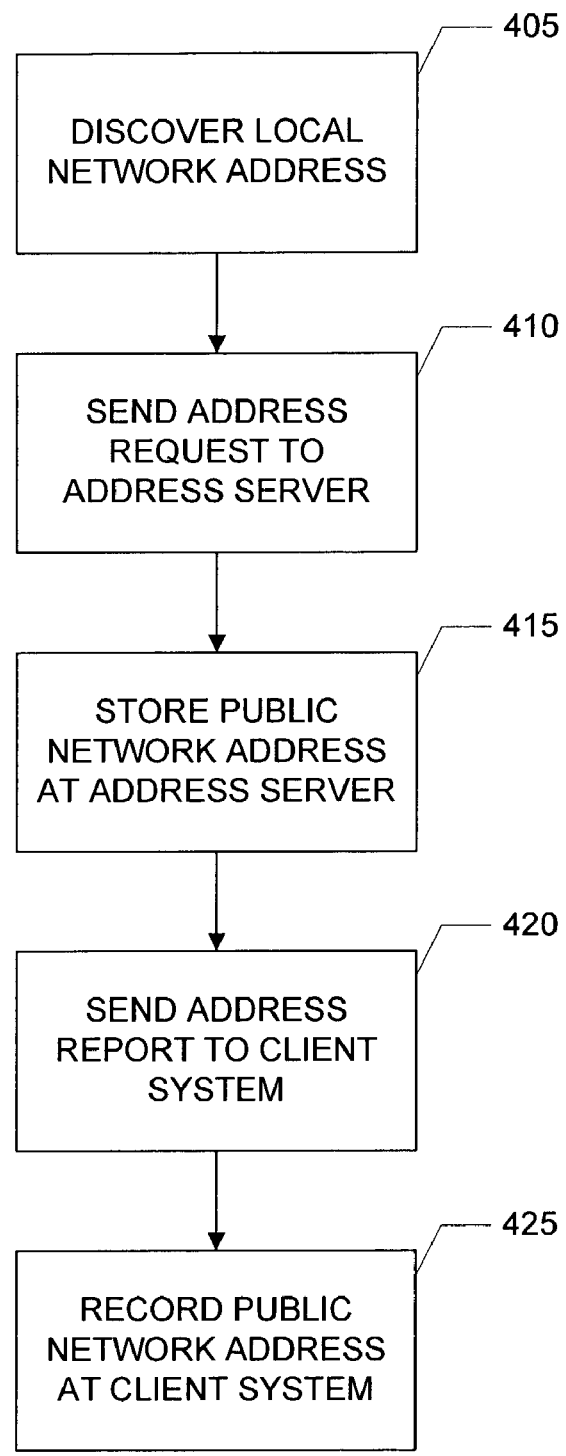
FIG. 4 is a flowchart of a client system discovering its local and public network addresses.

FIG. 4 is a flowchart of a client system discovering its local and public network addresses (recall block 305 of FIG. 3). As described above, the local network address is the network address of the client system in a local network and is assigned by a NAT device connected to the local network. The public network address is the network address on the external network shared by a NAT device among the systems in the local network connected to the NAT device. In one implementation, a local or public network addresses includes an address number and a port number. The client system uses its network address manager component to discover its public and local network addresses (recall network address manager 205 in FIG. 2).

A client system first discovers its local network address, block 405. In one implementation, a client system discovers its local public address by accessing local storage, such as by querying the network stack software used by the client system. The client system establishes the local port number when the client system initiates communication with the NAT device and so the client system is already aware of the port number. Alternatively, the client system can request the local network address from the corresponding NAT device. The client system sends an address request to the address server to discover the public network address, block 410. The client system sends the address request to the address server through the NAT device. As part of the NAT device's network address translation functionality, the NAT device adds the public network address to the address request, such as in header information for the address request. If the NAT device has not already assigned a port number to the client system, the NAT device assigns a port number and includes the port number in the public network address in the address request (e.g., in the UDP header). The address server extracts the public network address from the address request and stores the public network address, block 415. The public network address is located within the address request at a known location (e.g., within the header) so the address server can find the public network address in the address request. In an alternative implementation, the address server does not store the public network address or only stores the public network address temporarily. The address server returns the public network address to the client system by generating an address report and sending the address report to the client system, block 420. The address report includes the extracted public network address as part of the data or payload of the message as well as in the addressing portion of the message (e.g., in the header). The NAT device converts the public network address to the client system's local network address according to the port number and forwards the address report to the client system. For example, the NAT device accesses the port mapping for the client system according to the port number of the public network address and retrieves the local network address. The NAT device then replaces the public network address in the message's header information with the local network address. Accordingly, the NAT device modifies the header by removing the public network address, but does not modify the data portion of the message. The client system receives the address report and stores the included public network address, block 425. The client system has now discovered its local and public network addresses.

Figure 5:
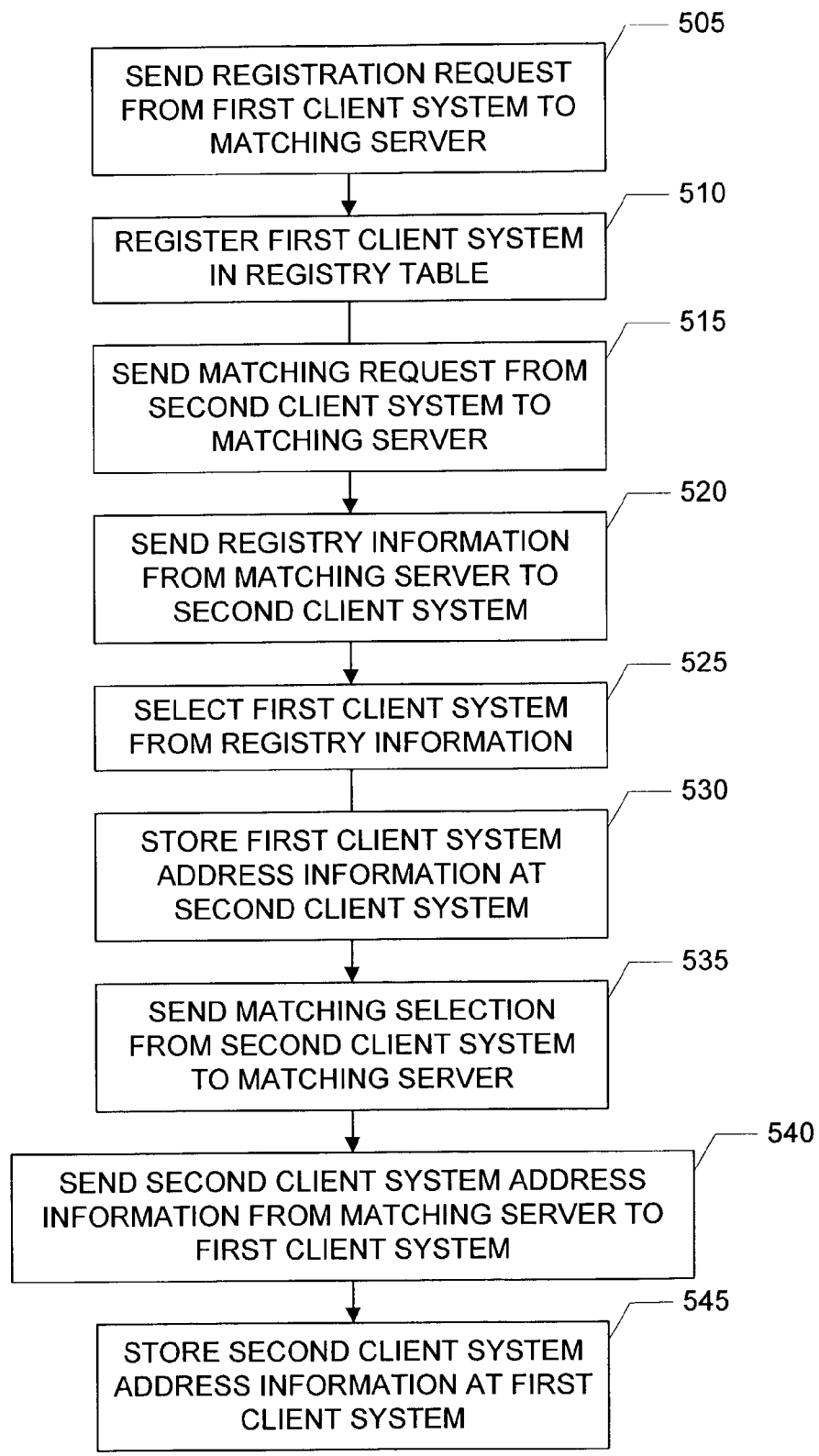
FIG. 5 is a flowchart of two client systems sharing their local and public network addresses.

FIG. 5 is a flowchart of two client systems sharing their local and public network addresses (recall block 310 of FIG. 3). A first client system registers with the matching server, block 505. A client system uses its network registration manager component to manage registering with the matching server (recall network registration manager 210 in FIG. 2). The first client system sends a registration request to the matching server. The registration request includes the first client system's discovered local and public network addresses. The registration request indicates to the matching server that the sending client system is available for communication using the provided address information. The matching server registers the first client system in a registry table, block 510. The matching server maintains a registry table with entries storing address information for registered systems. The matching server creates an entry in the registry table for the first client system and records the provided address information in the entry. The second client system sends a matching request to the matching server, block 515. A client system uses its network sharing manager component to manage obtaining the address information for another client system from the matching server (recall network sharing manager 215 in FIG. 2), both to select a registered client system and to receive address information after registering, as described below. The matching request indicates to the matching server that the second client system is requesting information to establish communication with another client system. The matching server sends registry information to the second client system, block 520. In one implementation, the matching server sends the registry table to the second client system. In another implementation, the matching server communicates with the second client system so that the second client system can access the registry table to identify a registered client system with which to communicate, such as by accepting search queries from the second client system. The second client system selects the first client system from among the registered client systems, block 525. The second client system stores the address information for the first client system, block 530. In one implementation, the registry information sent to the second client system includes address information for the registered client systems. In another implementation, the second client system separately requests the address information for the selected client system from the matching server. The second client system sends a matching selection to the matching server, block 535. The matching selection indicates with which of the registered client systems the second client system is to communicate (in this case, the first client system). The matching selection also includes the second client system's address information. In one implementation, the matching selection also serves as a request for the address of the first client system. The matching server sends the second client system's address information to the first client system as the selected client system, block 540. The first client system receives and records the second client system's address information, block 545. Each of the two client systems have now shared their address information with the other client system through the matching server.

Figure 6:
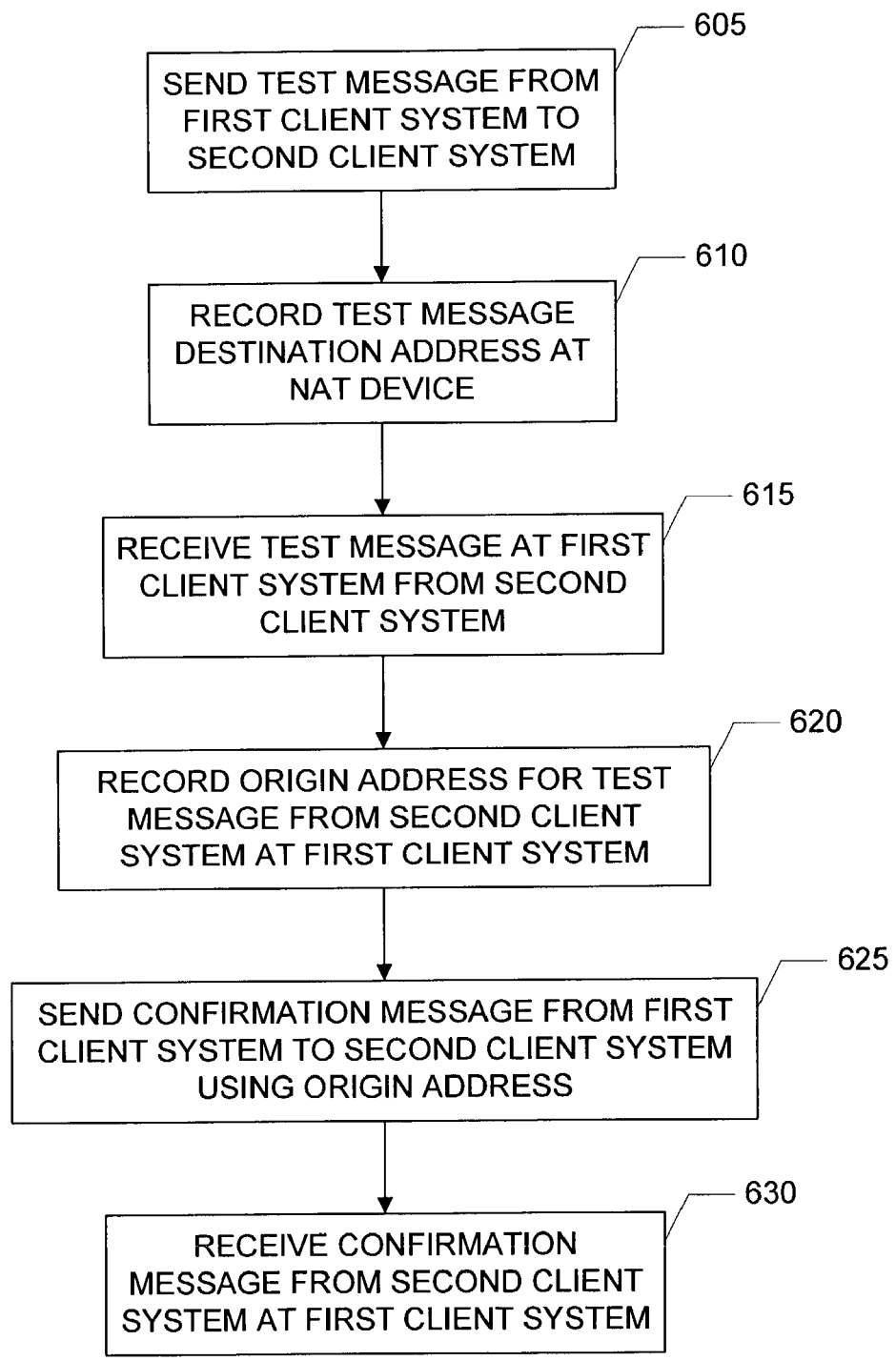
FIG. 6 is a flowchart of a first client system establishing communication with a second client system.

FIG. 6 is a flowchart of a first client system establishing communication with a second client system (recall block 315 of FIG. 3). The first client system sends one or more test messages to the second client system, block 605. The first client system sends some of the test messages to the second client system using the public network address for the second client system (outgoing public address test messages) and some of the test messages using the local network address for the second client system (outgoing local address test messages). As described above, the first client system received the public and local network addresses for the second client system when the two client systems shared address information (recall FIG. 5). In an implementation where the local network addresses of the second client system's local network are not compatible with the external network (e.g., the local network addresses are not recognizable under the communication protocol of the external network), the first client system does not send test messages using the local network address. The first client system continues to send test messages to the second client system until the first client system receives a confirmation message from the second client system in block 630, as described below.

The NAT device connected to the first client system records the destination addresses of the outgoing test messages, block 610. The NAT device connected to the first client system (e.g., the first NAT device 110 in FIG. 1) is a gateway between the local network of the first client system and the external network. Accordingly, the outgoing test messages pass through the NAT device. As described above, the NAT device screens incoming data and does not allow data to enter the NAT device's local network unless the local network destination of the incoming data has already attempted to communicate with the sender of the incoming data. The NAT device records the destination address of outgoing data from the systems on the local network as "approved" addresses for the sender of the outgoing data. The NAT device compares the origin address of the incoming data (i.e., the address of the sender) with recorded "approved" addresses for the intended recipient on the local network. The NAT device only forwards incoming data to the local recipient when the origin address matches one of the "approved" addresses for the local recipient.

Accordingly, the NAT device records the destination addresses of the outgoing test messages as "approved" addresses of systems with which the first client system is attempting to communicate. When the NAT device receives data for the first client system that is from the same address as the destination address of one of the first client system's outgoing test messages, the NAT device forwards the incoming data to the first client system. The first client system is sending test messages to addresses for the second client system, so the NAT device will forward data from the second client system to the first client system.

While the first client system is sending test messages to the second client system, the second client system is sending test messages to the first client system as well, as described below referring to FIG. 7. As described above for the first client system, the second client system sends outgoing public address test messages (and outgoing local address test messages if appropriate) using the address information for the first client system. The NAT device connected to the second client system (e.g., the second NAT device 130 in FIG. 1)

records the destination addresses for the outgoing test messages and so will forward incoming data for the second client system received from the first client system.

The first client system receives a test message from the second client system, block 615. As described above, the NAT device connected to the first client system forwards an incoming test message from the second client system to the first client system because the NAT device matches the origin address of the incoming test message with a recorded "approved" address. The first client system records the origin address of the received test message, block 620. The first client system sends a confirmation message to the second client system using the recorded origin address, block 625. The outgoing confirmation message indicates to the second client system that the first client system has received a test message from the second client system. Similarly, the second client system receives a test message from the first client system and sends a confirmation message to the first client system using the origin address of that test message. The first client system receives a confirmation message from the second client system, block 630. When the first client system receives a confirmation message from the second client system, the first client system stops sending test messages to the second client system. The first client system has now established communication with the second client system. After the second client receives the confirmation message from the first client system, the second client system will have established communication with the first client system. The client systems have confirmed an address to which each system can send data and have that data successfully pass through the NAT device of the recipient system.

By first sending test messages addressed to the second client system so that the NAT device will forward messages from the second client system to the first client system, the first client system is "punching holes" in the security features of the NAT device. Accordingly, this technique is referred to as "hole punching." Using "hole punching" the first and second client systems can establish communication without altering the operation of the NAT devices.

Figure 7:
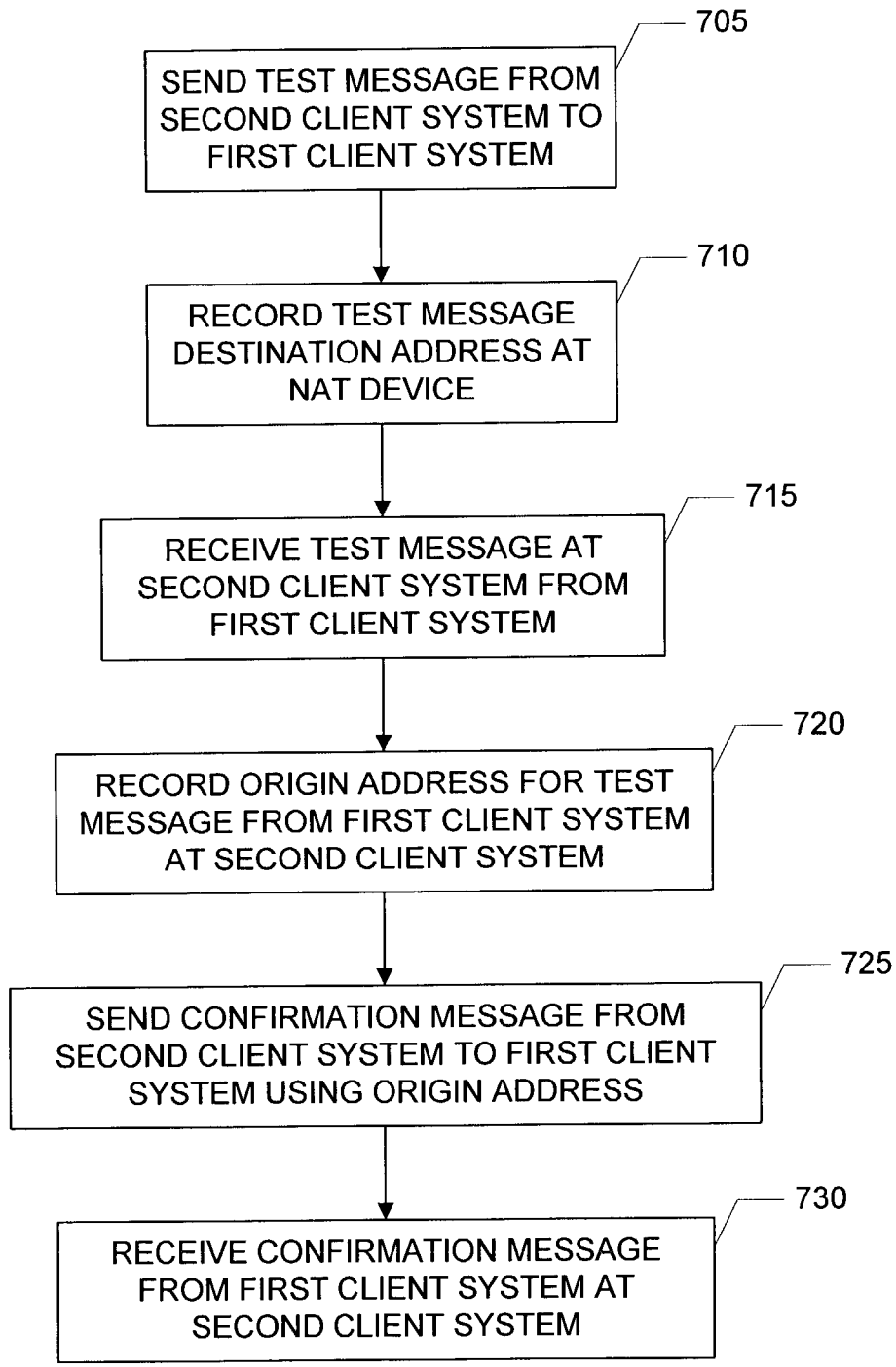
FIG. 7 is a flowchart of the second client system establishing communication with the first client system.

FIG. 7 is a flowchart of the second client system establishing communication with the first client system. The actions of FIG. 7 occur in conjunction with those described above referring to FIG. 6. The second client system sends test messages to the first client system using the address information received when the client systems shared address information, block 705. As noted above, the second client system sends outgoing public address test messages using the first client system's public network address and also sends outgoing local address test messages if the local network address is compatible with the external network. The second client system continues to send test messages to the first client system until the second client system receives a confirmation message from the first client system in block 730, as described below. The NAT device connected to the second client system records the destination addresses for the outgoing test messages as "approved" addresses, block 710. As described above, the first client system is also sending test messages to the second client system and the second client system receives a test message from the first client system, block 715. The second client system records the origin address of the received test message, block 720, and sends a confirmation message to the first client system using the origin message, block 725. As described above, the first client system also sends a confirmation message to the second client system after receiving a test message from the second client system and the second client system receives the confirmation message, block 730. When the second client system receives a confirmation message from the first client system, the second client system stops sending test messages to the first client system. The second client system has now established communication with the first client system.

Figure 8:
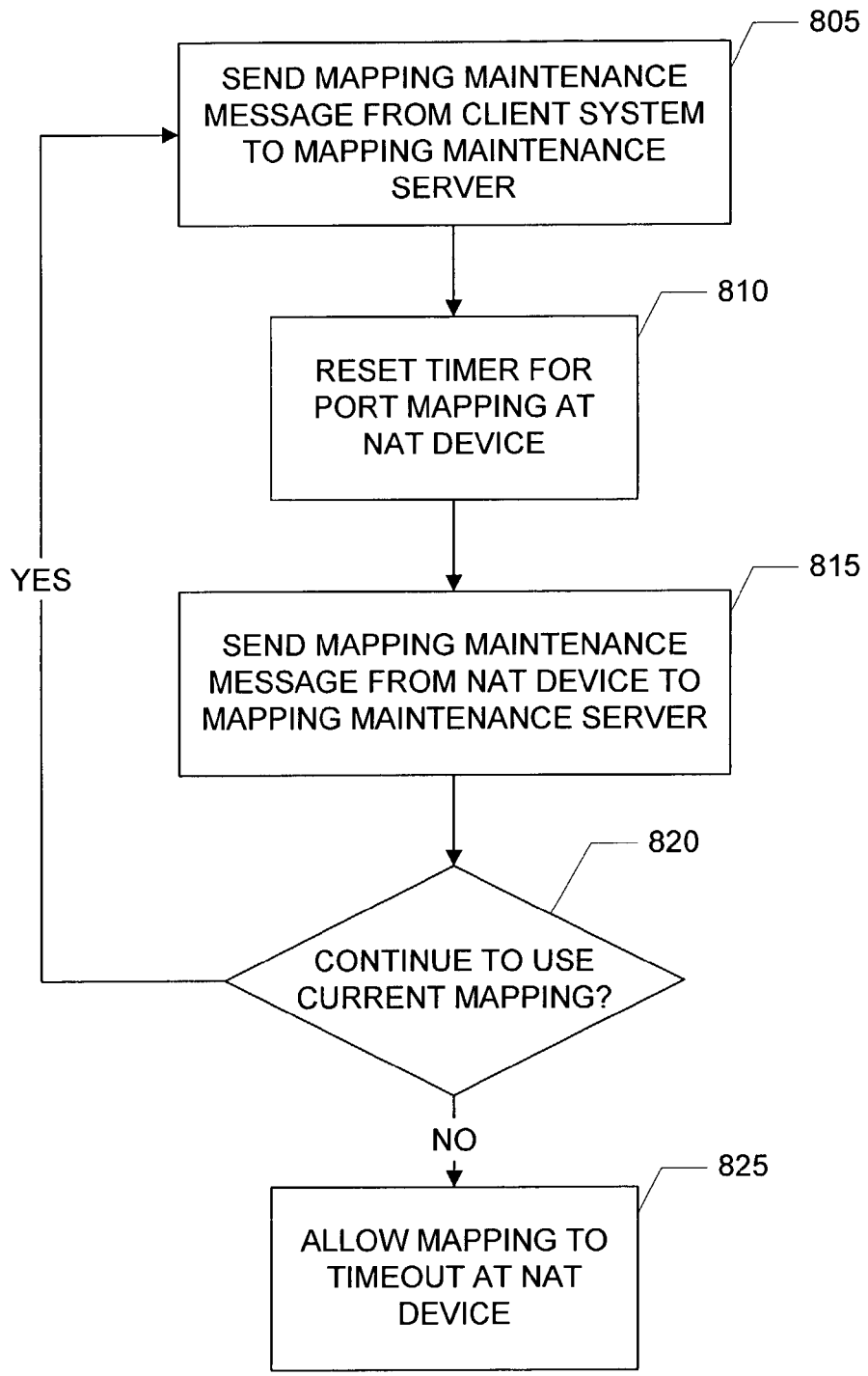
FIG. 8 is a flowchart of a client system maintaining the mapping assigned by a connected NAT device.

FIG. 8 is a flowchart of a client system maintaining the mapping assigned by a connected NAT device (recall block 315 of FIG. 3). A client system uses its network mapping maintenance manager component to manage maintaining the address mapping of a connected NAT device with the mapping maintenance server (recall network mapping maintenance manager 220 in FIG. 2). As described above, in one implementation, a NAT device assigns local network addresses to the systems on the local network of the NAT device. The NAT device also assigns port numbers for the public network address used by local systems. When a local system sends data to the external network, the NAT device assigns a port number to the local system and stores the port number. When the NAT device receives incoming data, the NAT device checks the port number in the target address for the incoming data (e.g., in the header information) to determine which local system is the intended recipient. As described above the NAT device also uses the port number to confirm that the sender of the incoming data is "approved" before forwarding the data to the local system. Once the NAT device has assigned a port number to a local system, the NAT device begins counting down a timer. If the local system sends more data to the external network, the NAT device uses the same port number and resets the timer. Similarly, if the NAT device receives incoming data using the port number, the NAT device resets the timer. If the timer reaches zero, the NAT device frees the port number (a "timeout") because the port number has not been used recently. To prevent this "timeout" a client system periodically sends mapping maintenance messages to the mapping maintenance server while the client system is communicating or attempting to communicate with another client system. As described above, in one implementation, the mapping maintenance server is included within the address server or the matching server and so the client system sends mapping maintenance messages to the appropriate server. In one implementation not including a mapping maintenance server, the client system does not send mapping maintenance messages.

The client system sends a mapping maintenance message to the mapping maintenance server through the connected NAT device, block 805. Referring to FIG. 1, the first client system 105 sends a mapping maintenance message through the first NAT device 110 to the mapping maintenance server 150. The NAT device receives the mapping maintenance message and resets the timer for the port number assigned to the client system, block 810. The NAT device sends the mapping maintenance message to the mapping maintenance server, block 815. After a predetermined period, the client system evaluates whether to maintain the current address, block 820. If the client system is communicating with another client system or attempting to communicate with another client system, the client system sends another mapping maintenance to the mapping maintenance server to preserve the current port mapping, returning to block 805. If the client system is done communicating, the client system does not send another mapping maintenance message and allows the port mapping to timeout, block 825. In one implementation, the mapping maintenance server does not respond to the client system. Alternatively, the mapping maintenance server sends a mapping maintenance confirmation message to the client system.

Figure 9A:
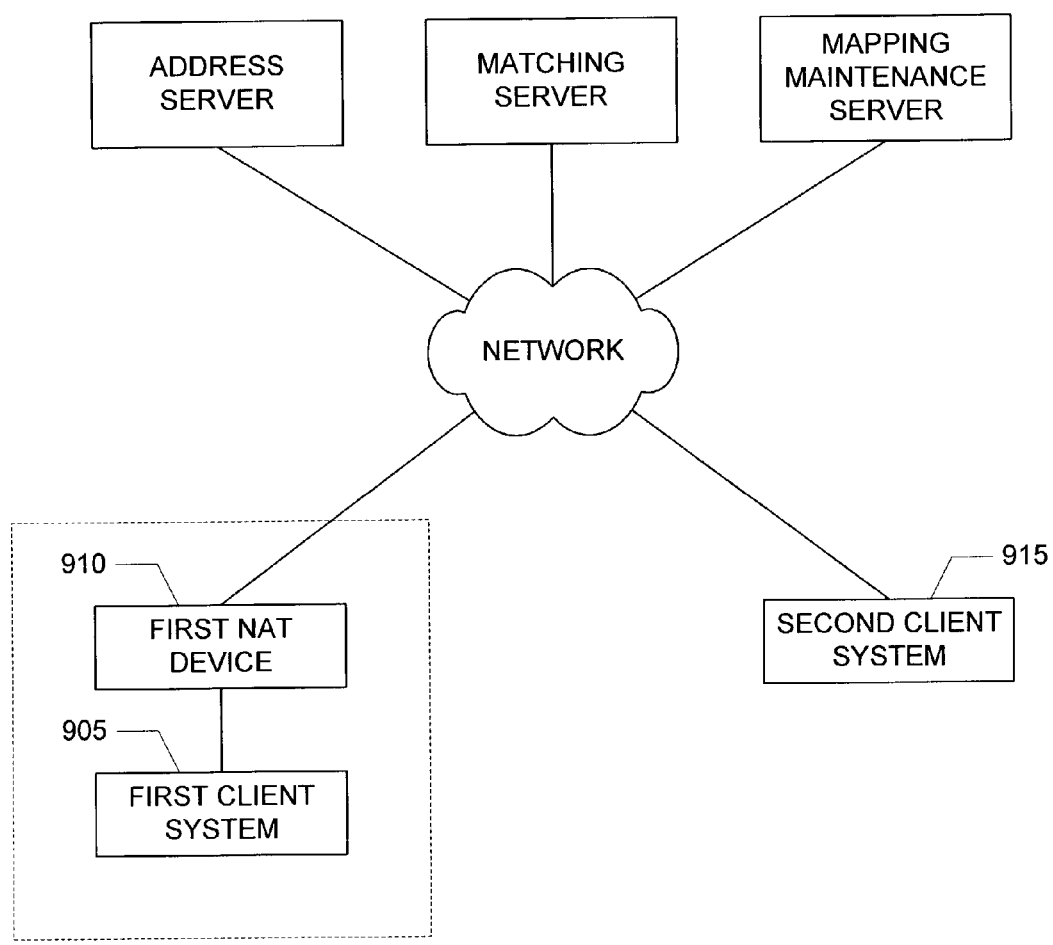
FIGS. 9A-9C show alternative network configurations.
Figure 9B:
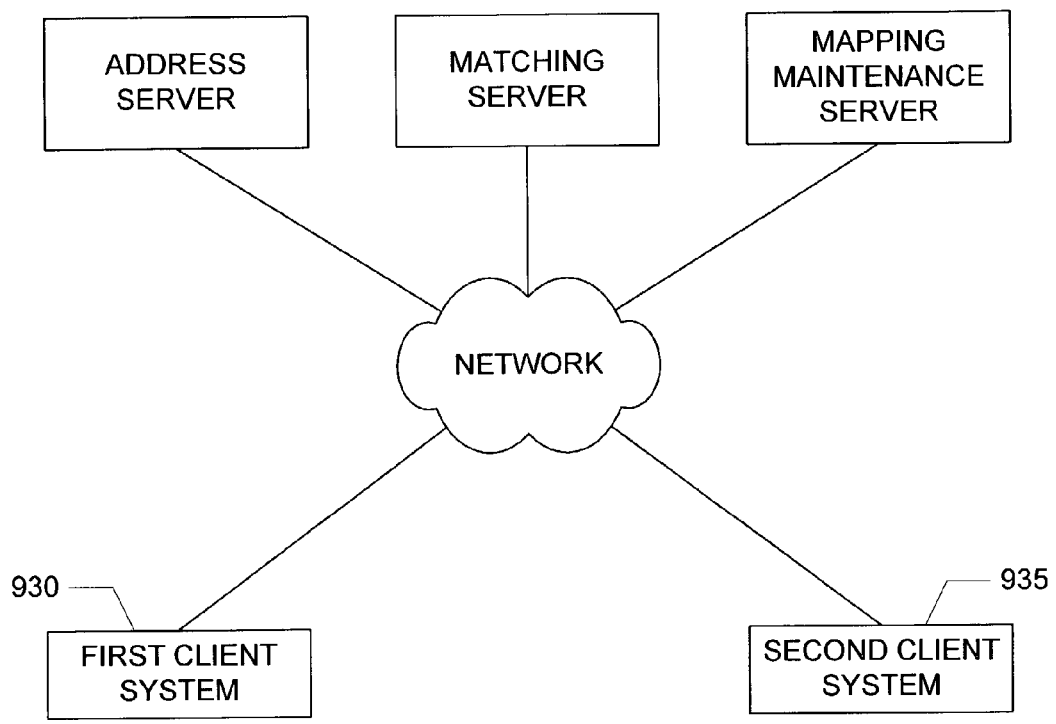
Figure 9C:
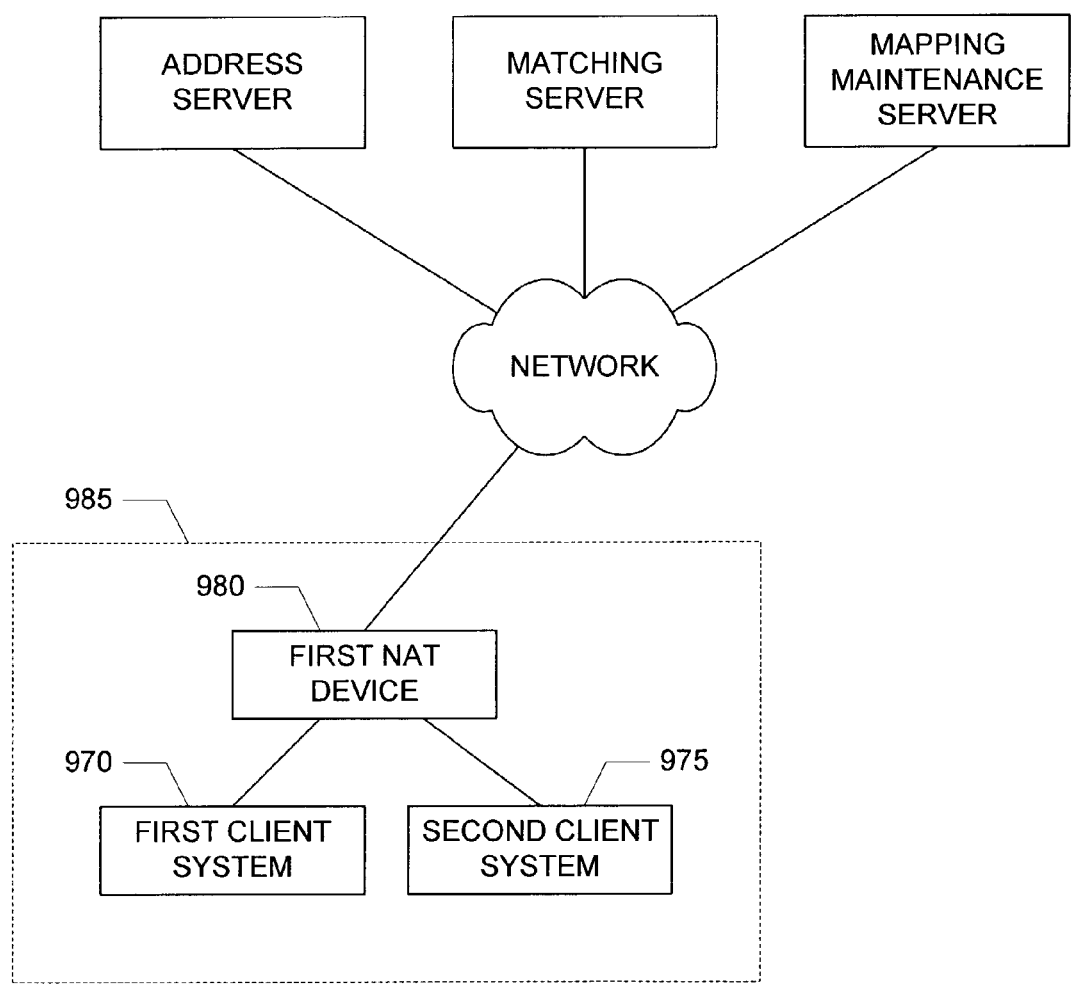

While the description above focuses on a network configuration where two client systems are behind respective NAT devices (recall FIG. 1), the operation of the two client systems and the server systems are independent of the presence of NAT devices. FIGS. 9A-9C show alternative network configurations. In FIG. 9A, a first client system 905 is behind a NAT device 910 while a second client system 915 is not connected to a NAT device. In FIG. 9B, both client systems 930, 935 are not connected to NAT devices. In FIG. 9C, both client systems 970, 975 are behind the same NAT device 980 in the same local network 985. In each of these alternative configurations, as well as other variations, the client systems and server systems can interact in substantially the same way as described above.

The various implementations of the invention are realized in electronic hardware, computer software, or combinations of these technologies. Most implementations include one or more computer programs executed by a programmable computer. For example, referring to FIG. 1, in one implementation, each client system 105, 125 and server system 140, 145, 150 includes one or more programmable computers implementing the respective aspects of the network system described above. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. Accordingly, the present invention is not limited to only those implementations described above.

What is claimed is:

1. A method of communicating between a first client system and a second client system, comprising:
   discovering first address information for a first client system connected to a first network address translation device by sending a first address request from the first client system to an address server in communication with the first network address translation device;
   establishing a mapping between the first client system and a first network address by registering said first address information to a matching server,
      said first network address including an address number and a port number associated with said first client system attached to said first network address translation device, said port number mapped to said first client system using port address translation;
   sharing the first address information with a second client system;
   screening incoming data to the first client system,
   authorizing second address information to be received by the first client system;
   receiving authorized second address information, at the first client system, for the second client system,
   wherein the only second address information that is authorized and received is second address data that originates from a second client system that
   1) selected first client system to communicate with, and
   2) shared the second address information with a matching server, and
   3) received a test message from the first client system after the matching server sent the first client system the second address information of the second client system; and
   establishing communication between the first client system and the second client system using the second address information.

2. The method of claim 1, further comprising:
   maintaining a first mapping in the first network address translation device between the first client system and the first network address.

3. The method of claim 1, where the first address information and the second address information each include a public network address and a local network address.

4. The method of claim 3, where each public network address includes an address number and a port number.

5. The method of claim 4, where the address number of the first public network address is the address number for the network address translation device and the port number of the first public address indicates the first client system.

6. The method of claim 3, where each local network address includes an address number and a port number.

7. The method of claim 1, where discovering first address information includes:
   discovering a first local network address for a first client system connected to a first network address translation device; and
   discovering a first public network address for the first client system.

8. The method of claim 7, where discovering the first local network address for the first client system includes
   retrieving the first local network address from an address stack within the first client system.

9. The method of claim 7, where discovering the first public network address for the first client system includes:
   receiving a first address report from the address server at the first client system,
   where the first address report includes the first public network address.

10. The method of claim 1, where sharing the first address information with the second client system includes
   sending a registration request from the first client system to a matching server connected to the network, where the registration request includes the first address information.

11. The method of claim 1, where establishing communication between the first client system and the second client system includes:
   sending one or more outgoing test messages from the first client system to the second client system using the second address information;
   receiving an incoming test message from the second client system at the first client system,
   where the incoming test message includes an origin network address indicating the network address from which the incoming test message was sent;
   recording the origin network address;
   sending an outgoing confirmation message from the first client system to the second client system using the recorded origin network address; and
   receiving an incoming confirmation message from the second client system at the first client system.

12. The method of claim 11, where the first address information includes a first public network address and a first local network address and the second address information includes a second public network address and a second local network address.

13. The method of claim 12, where sending one or more outgoing test messages includes:
   sending one or more outgoing public address test messages from the first client system to the second client system using the second public network address; and
   sending one or more outgoing local address test messages from the first client system to the second client system using the second local network address.

14. The method of claim 12, where the incoming test message received from the second client system at the first client system is addressed using the first public network address.

15. The method of claim 12, where the incoming test message received from the second client system at the first client system is addressed using the first local network address.

16. The method of claim 12, where the origin network address is the second public network address.

17. The method of claim 12, where the origin network address is the second local network address.

18. The method of claim 12, where the incoming confirmation message received from the second client system at the first client system is addressed using the first public network address.

19. The method of claim 12, where the incoming confirmation message received from the second client system at the first client system is addressed using the first local network address.

20. A method of peer to peer network communication, comprising:
   discovering a first network address for a first client system connected to a first network address translation device by sending a first address request from the first client system to an address server in communication with the first network address translation device;
   establishing a mapping between the first client system and a first network address by registering said first address information to a matching server,
      said first network address including an address number and a port number associated with said first client system attached to said first network address translation device, said port number mapped to said first client system using port address translation;
   discovering a second network address for a second client system connected to a second network address translation device;
   sharing the first network address with the second client system;
   sharing the second network address with the first client system;
   screening incoming data to the first client system,
   authorizing data to be received by the first client system,
   wherein the only data that is authorized and received is second network address data that originates from a second client system that
   1) selected first client system to communicate with, and
   2) shared the second address network information with a matching server, and
   3) received a test message from the first client system after the matching server sent the first client system the second address information of the second client system; and
   establishing communication between the first client system and the second client system using the first network address and the second network address.

21. The method of claim 20, further comprising
   maintaining a first mapping in the first network address translation device between the first client system and the first network address and maintaining a second mapping in the second network address translation device between the second client system and the second network address.

22. A computer program, stored on a tangible storage medium, for use in communicating between a first client system and a second client system, the program comprising executable instructions that cause a computer to:
   discover first address information for a first client system connected to a first network address translation device by sending a first address request from the first client system to an address server in communication with the first network address translation device;
   establishing a mapping between the first client system and a first network address by registering said first address information to a matching server,
      said first network address including an address number and a port number associated with said first client system attached to said first network address translation device,
      said port number mapped to said first client system using port address translation;
   share the first address information with a second client system;
   screen incoming data to the first client system,
   authorizing second address information to be received by the first client system;
   receive authorized second address information, at the first client system, for the second client system,
   wherein the only second address information that is authorized and received is second address data that originates from a second client system that:
   1) selected first client system to communicate with, and
   2) shared the second address information with a matching server, and
   3) received a test message from the first client system after the matching server sent the first client system the second address information of the second client system; and
   establish communication between the first client system and the second client system using the second address information.

23. The computer program of claim 22, further comprising executable instructions that cause a computer to
   maintain a first mapping in the first network address translation device between the first client system and the first network address.

24. The computer program of claim 22, where the first address information and the second address information each include
   a public network address and a local network address.

25. The computer program of claim 24, where each public network address includes an address number and a port number.

26. The computer program of claim 25, where the address number of the first public network address is the address number for the network address translation device and the port number of the first public address indicates the first client system.

27. The computer program of claim 24, where each local network address includes an address number and a port number.

28. The computer program of claim 22, where discovering first address information includes:
   discovering a first local network address for a first client system connected to a first network address translation device; and discovering a first public network address for the first client system.

29. The computer program of claim 27, where discovering the first local network address for the first client system includes
retrieving the first local network address from an address stack within the first client system.

30. The computer program of claim 27, where discovering the first public network address for the first client system includes:
receiving a first address report from the address server at the first client system,
where the first address report includes the first public network address.

31. The computer program of claim 22, where sharing the first address information with the second client system includes
sending a registration request from the first client system to a matching server connected to the network,
where the registration request includes the first address information.

32. The computer program of claim 22, where establishing communication between the first client system and the second client system includes:
sending one or more outgoing test messages from the first client system to the second client system using the second address information;
receiving an incoming test message from the second client system at the first client system,
where the incoming test message includes an origin network address indicating the network address from which the incoming test message was sent;
recording the origin network address;
sending an outgoing confirmation message from the first client system to the second client system using the recorded origin network address; receiving an incoming confirmation message from the second client system at the first client system.

33. The computer program of claim 32, where the first address information includes a first public network address and a first local network address and the second address information includes
a second public network address and a second local network address.

34. The computer program of claim 33, where sending one or more outgoing test messages includes:
sending one or more outgoing public address test messages from the first client system to the second client system using the second public network address;
sending one or more outgoing local address test messages from the first client system to the second client system using the second local network address.

35. The computer program of claim 33, where the incoming test message received from the second client system at the first client system is addressed using the first public network address.

36. The computer program of claim 33, where the incoming test message received from the second client system at the first client system is addressed using the first local network address.

37. The computer program of claim 33, where the origin network address is the second public network address.

38. The computer program of claim 33, where the origin network address is the second local network address.

39. The computer program of claim 33, where the incoming confirmation message received from the second client system at the first client system is addressed using the first public network address.

40. The computer program of claim 33, where the incoming confirmation message received from the second client system at the first client system is addressed using the first local network address.

41. A system for communicating between a first client system and a second client system, comprising:
means for discovering first address information for a first client system connected to a first network address translation device by sending a first address request from the first client system to an address server in communication with the first network address translation device, establishing a mapping between the first client system and a first network address by registering said first address information to a matching server, said first network address including an address number and a port number associated with said first client system, said port number mapped to said first client system using port address translation;
means for sharing the first address information with a second client system;
means for receiving second address information for the second client system;
means for screening incoming data to the first client system,
means for authorizing second address information to be received by the first client system,
wherein the only second address information that is authorized and received is second address data that originates from a second client system that:
1) selected first client system to communicate with, and
2) shared the second address information with a matching server, and
3) received a test message from the first client system after the matching server sent the first client system the second address information of the second client system; and
means for establishing communication between the first client system and the second client system using the second address information.

* * * * *